United States Patent
Christoph

(10) Patent No.: US 9,075,683 B2
(45) Date of Patent: Jul. 7, 2015

(54) MEMORY DATABASE COMPLEX OBJECT DEPLOYMENT

(71) Applicant: Andreas Christoph, Dossenheim (DE)

(72) Inventor: Andreas Christoph, Dossenheim (DE)

(73) Assignee: SAP SE, Walldorf (DE)

( * ) Notice: Subject to any disclaimer, the term of this patent is extended or adjusted under 35 U.S.C. 154(b) by 416 days.

(21) Appl. No.: 13/689,076

(22) Filed: Nov. 29, 2012

(65) Prior Publication Data

US 2014/0149340 A1     May 29, 2014

(51) Int. Cl.
    *G06F 9/44*        (2006.01)
    *G06F 7/00*        (2006.01)
    *G06F 17/00*      (2006.01)
    *G06F 9/445*      (2006.01)
    *G06F 17/30*      (2006.01)

(52) U.S. Cl.
CPC ............ *G06F 8/65* (2013.01); *G06F 17/30345* (2013.01); *G06F 8/68* (2013.01); *G06F 8/30* (2013.01); *G06F 17/30292* (2013.01)

(58) Field of Classification Search
None
See application file for complete search history.

(56) References Cited

U.S. PATENT DOCUMENTS

2006/0294506 A1* 12/2006 Dengler et al. ............... 717/131
2007/0168947 A1* 7/2007 Halbedel et al. ............. 717/110
2009/0205013 A1* 8/2009 Lowes ............................. 726/1
2011/0239190 A1* 9/2011 Mueller et al. ............... 717/121
2012/0005190 A1   1/2012 Faerber et al.

OTHER PUBLICATIONS

"European Application Serial No. 13005374.7, Office Action mailed Feb. 11, 2015", 9 pgs.
"European Application Serial No. 13005374.7, Extended European Search Report mailed May 6, 2014", 9 pgs.
"SAP HANA Modeling Guide: SAP HANA Appliance Software SPS3", [Online]. Retrieved from the Internet: (Feb. 21, 2012), 1-54.
"SAP HANA Platform-Technical Overview Driving Innovations in IT and in Business with In-Memory Computing Technology", [Online]. Retrieved from the Internet: (Feb. 21, 2012), 1-20.
Farber, Franz, et al., "SAP HANA Database—Data Management for Modern Business Applications", SIGMOD Record, vol. 40, No. 4, [Online]. Retrieved from the Internet: (Dec. 1, 2011), 45-51.

* cited by examiner

*Primary Examiner* — Lewis A Bullock, Jr.
*Assistant Examiner* — Mark Gooray
(74) *Attorney, Agent, or Firm* — Schwegman Lundberg & Woessner, P.A.

(57) ABSTRACT

A system and method include receiving an in memory database application code update at a program that interfaces with the in memory database, obtaining customization date identifying changes made to the in memory database by a customer, generating a customized application code update to the in memory database as a function of changes identified, and applying the customized application code update to the in memory database to update a complex object running in the memory database without adversely affecting changes made to the in memory database by the customer.

16 Claims, 4 Drawing Sheets

MEMORY DATABASE COMPLEX OBJECT DEPLOYMENT

BACKGROUND

An in memory database management system primarily relies on direct access semiconductor based memory for computer data storage. Prior databases use disk drive storage, which can be quite a bit slower than direct access main memory. Main memory databases are faster than disk-optimized databases since the internal optimization algorithms are simpler and execute fewer CPU instructions. Accessing data in memory reduces the I/O reading activity when querying the data which provides faster and more predictable performance than disk. In applications where response time is critical, main-memory databases are often used.

Traditional, approaches to deploy applications that run on top of or within a database such as an memory database management system, such as SAP Hana studio, are either delivered by an application provider, or completely modeled by the customer. If delivered by the application provider, the views in such applications cannot reflect the customer's individual configuration and are therefore just a template for the customer, requiring adjustment each time the template is updated or the database configuration changes. Since views should be consumable by standard programs as well as customer programs the layout (view names, field names, data types) as well as the semantics (how to populate the fields) have to be agreed on between the application provider and the customer. A high risk of invalidated view objects are possible when the application provider provides support packages that are installed, configurations changed, or the database management system is otherwise upgraded or modified.

SUMMARY

A system and method include receiving an in memory database application code update at a program that interlaces with the in memory database, obtaining customization data identifying changes made to the in memory database by a customer, generating a customized application code update to the in memory database as a function of changes identified, and applying the customized application code update to the in memory database to update a complex object running in the memory database without adversely affecting changes made to the in memory database by the customer.

A computer readable storage device has instructions to cause specifically programmed machine to perform a-method, the method including receiving an in memory database application code update at a program that interlaces with the in memory database, obtaining customization data identifying changes made to the in memory database by a customer, generating a customized application code update to the in memory database as a function of changes identified, and applying the customized application code update to the in memory database to update a complex object running in the memory database without adversely affecting changes made to the in memory database by the customer.

A system includes an application server running on a processor, the application server programmed to receive an in memory database application code update, read customization information from the in memory database, customize the in memory database application code update as a function of the read customization information, and deploy the customized application code update as a complex object to run in the in memory database.

DETAILED DESCRIPTION

Figure 1:
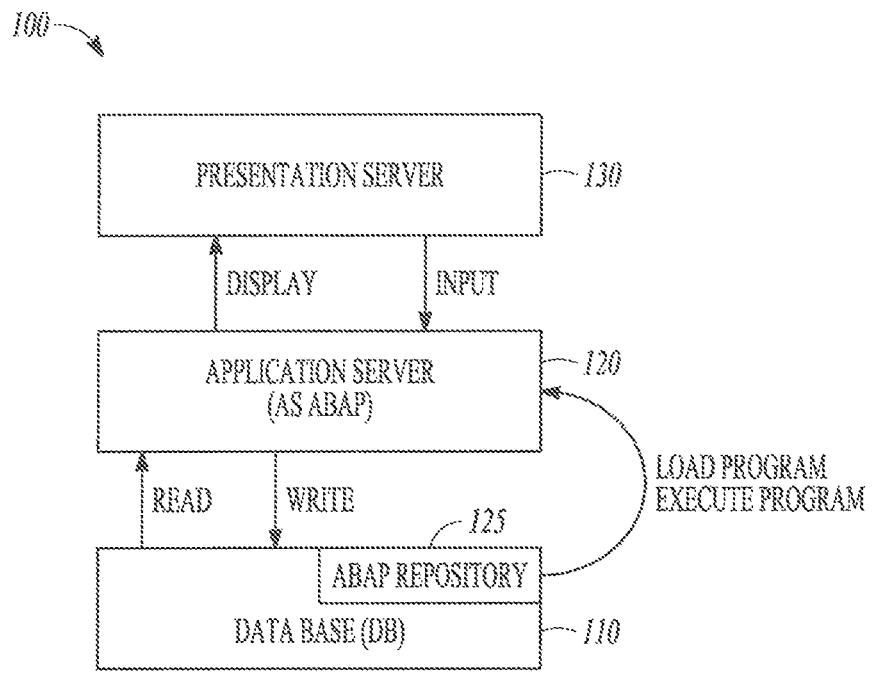
FIG. 1 is a block diagram of an enterprise resource system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination, thereof. Multiple functions may be performed in one or more modules as desired, and the embodiments described are merely examples. The software may be executed on a digital signal processor, ASIC, microprocessor, or other type of processor operating cm a computer system, such as a personal computer, server or other computer system.

Views provided by an in memory database, such as SAP Hana, utilized by a customer system are based on proprietary application knowledge and existing application customizing in order to optimize data access and push down application knowledge into the in memory database. The approach provides an especially good fit for applications where a data model can be extended by the customer (either through application functionality or table APPENDS in DDIC (data dictionary), or where data is contained in specific fields of the data model and has to be interpreted using customizing settings in order to determine the meaning of the data in the application context (e.g. value fields in a financials component of an enterprise resource planning suite depending on customizing of ledger and company code). The challenge in consuming in memory database views from an ABAP (a high level programming language) stack sitting on top of the database is that an in memory database may not be designed for this use case. An ABAP based stack is just one example of a view consumer, and other programming languages may alternatively be used. As a general purpose analytic appliance, an in memory database may come with its own software lifecycle management. Views like calculation views or OLAP (online analytical processing) Views are modeled in a content modeler in an in memory database, such as HANA Studio modeling tools, and can be delivered to customers as packages in delivery units. The delivery units are installed at the customer site and are activated to create consumable runtime objects.

ABAP and other language-based products like the SAP Business Suite have an established lifecycle management based on Support Packages and OSS (online service system from SAP) notes. Product maintenance thus requires synchronized customer activities in both delivery worlds. The efforts on the HANA side cannot be overestimated since any new Support Package as well as configuration changes may require manual adjustment of the views which in turn requires consul tots with in-depth knowledge of the HANA Content Modeler as well as the specific application's data model.

In SAP Financials' NewGL for example the complexity includes configurable source table names, fields and currency types. HANA runtime objects are generated from generation programs implemented in ABAP directly via SQL DDL statements. The HANA delivery model is completely bypassed. No HANA packages or delivery units are needed.

The generation programs analyze relevant configuration settings directly in the customer's system and provide them in special tables that can be joined with the fact tables and master data tables into the HANA views. These ABAP generation programs are triggered by release installation. Support Package installation as well as configuration changes and after import of customizing transports so it is assured the generated view objects are never invalidated.

This eliminates the need for any manual activation or even adjustment of delivered HANA content providing a seamless integration of HANA content virtually integrated into release and Support Package delivery. This clearly reduces the TCO (total cost of ownership) of any combined ABAP/HANA product SAP development delivers generation templates as ABAP Includes that can be imagined as DDL statements with variable parts. During generation in a customer's system the variable parts are replaced by the final literals (e.g., table names, field names, . . . ) before the individually completed statements are sent to the HANA DB to create the views' runtime objects.

These templates as well as the generation programs with view specific (but customer independent) logic can be delivered as product release or later as Support Package.

For easy consumption of these HANA views in standard SAP programs or customer programs transparent tables or external views are created in the ABAP DDIC allowing access with OpenSQL statements from an ABAP program.

An Enterprise Resource Planning (ERP) system 100 consists or a three-tier architecture as illustrated in block diagram form in FIG. 1. On a bottom tier is a DataBase 110 (DB) which can be one of various vendors' products (Oracle, IBM, Microsoft or SAP). On top of the database tier 110 is an application server (AS) 120 (for example SAP AS ABAP) which can execute ABAP code. There might be several instances of AS 120 for scaling reasons. ABAP programs 125 may be stored in database 110. Data is transferred between the database 110 and AS 120 using read, and write functions.

The database 110 and AS 120 form a so-called "backend." On top of the backend is a presentation layer 130, typically a graphical user interface (GUI) type program that a user interacts with directly. Data from AS 120 is displayed by presentation layer 130. Data may also be imported into AS 120 from presentation layer 130. One example GUI is an SAP GUI, but there are alternatives like an Internet Browser, Microsoft Excel spreadsheet program, etc. The GUI is the "frontend" directly running on the user's PC or mobile device.

In prior EFP systems, the database is only used as a data store for the configuration data, the master data and movement data as well as the ABAP program repository that is located in the database. However the execution of all kinds of business logic takes place in AS ABAP after the programs have been loaded from this repository. Prior databases are a rather passive component that only returns or updates data as requested by the AS ABAP and ensures the transactional integrity. Keep in mind a database is basically a standalone product that does not know about the context (under an AS ABAP or something else) it is running in.

The ERP system 100 only uses common core functionality known to all DB platforms, it organizes data mainly in tables (T), Indexes (I) for faster access and database views (V) modeling dependencies between the tables. Software logistics (delivery and deployment of new functionality and bug fixes) is needed.

On the DB 110 layer, various DB vendors offer technical bug fixes for the DB only, no business logic is involved here (DB seen as a standalone product). On the application layer SAP utilizes correction notes (single corrections that can be implemented either manually or partly automatic nowadays: Note Assistant) and Support Packages and Upgrade transports which are collections of corrections or a complete replacement.

Technically the corrections on the application layer are binary files holding compressed data of transportable objects which on the lowest level are collections of table entries that are imported into the DB 110. Some transport objects deliver the ABAP program sources and related objects. Others deliver metadata for DB objects that describes what the table (T), View (V) or index (I) should look like.

For the latter, a transport control program (TP) during import writes this metadata into the already existing control tables of the Data Dictionary (DDIC). These table names start with "DD" in one embodiment.

In a later phase during the upgrade or Support Package installation the so called "DDIC activation" takes place. This means an ABAP program (the DDIC Activator) reads, the metadata from the "DD" tables, compares the object definitions to the previous (currently active) versions and decides what to do, typically it would DROP, CREATE or ALTER the objects accordingly by sending the corresponding SQL commands to the database.

Figure 2:
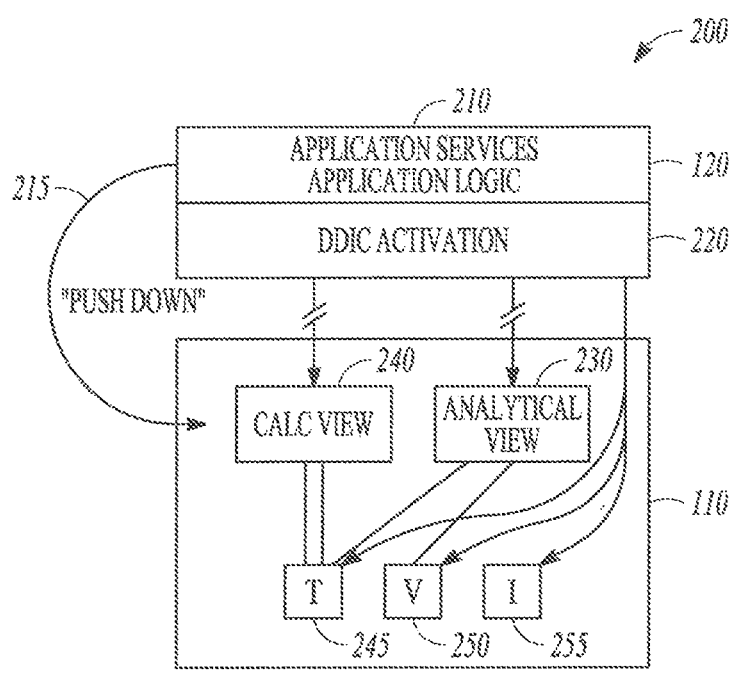
FIG. 2 is a block diagram illustrating a push down of functions into an in memory database according to an example embodiment.

FIG. 2 is a block diagram 200 illustrating a push down of functions to database 110. When the database is an in memory database 110, such as HANA, the database becomes more than just a passive data store. An in memory database may execute significant parts of application logic 210 by itself. Application logic, in the form of complex objects in one embodiment, is pushed down 215 from the AS 120 ABAP to the database 110 level.

Instead of reading mass data from disks as in prior databases and transferring it up to AS ABAP (both slow) via DDIC activation 220 where the data is aggregated for reporting etc., the code runs in the in memory database 110, reads and aggregates the data in main memory and returns the pre-aggregated data to the application server 120. AS 120 mainly performs some final processing and the presentation-near services before sending data on to the presentation server 130.

Database 110 offers some new view types like analytical views 230 and in particular calculation views 240 which can be built on top of the tables 245 and in the case of calculation views can hold very complex procedural logic (formulae, loops, conditions, ... ) that may be implemented in an SAP language named "SQLScript" originally released with HANA, or other language in further embodiments. Analytical views 230 may utilize data in tables 245, views 250, and indexes 255 in some embodiments.

Figure 3:
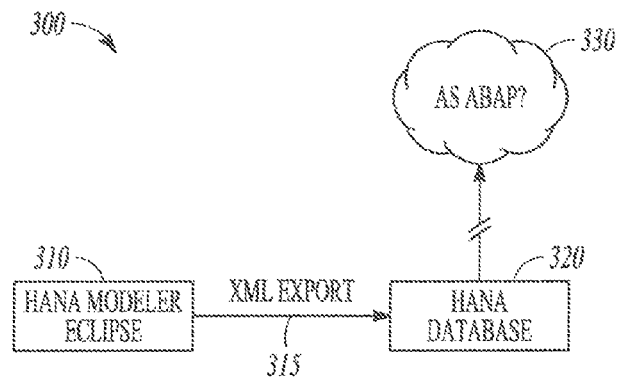
FIG. 3 is block diagram illustrating generation of complex views in an in memory database according to an example embodiment.

The problem now is that the Data Dictionary 220 does not support definition or even activation of these complex objects. So the traditional deployment approach via transports is not applicable. In one embodiment 300, a developer creates "database content" (definition of tables and views) in a database modeler, such as a HANA modeler 310 as shown in block form in FIG. 3, an Eclipse-based development environment, exports 315 it (XML file) and ships this to the customer. At the customer site this XML is imported to an in memory database 320 and the tables and views are created (also called activation here). In memory database 320 doesn't know about the ERP 330 on top of it The traditional deployment approach is applicable in a standalone-in memory database application without an ERP system on top, but it does not offer any support for special features of an ERP environment. For example tables in an ERP system often have non-standard fields (added by an Industry Add-On or by the customer) or the table names may be dynamic and defined by the customer during the customizing process. The simple activation process with an example in memory database, HANA, cannot respond to this kind of dynamics.

So beside the fact that for ERP customers this would mean a new software logistics method that hasn't been established yet, this would not be flexible enough in an ERP environment.

This means that a database consultant would have to adapt the delivered sample model to the real environment found on the customers system. Potentially alter a customizing change or a new model being delivered, this costly procedure would have to be repeated.

Figure 4:
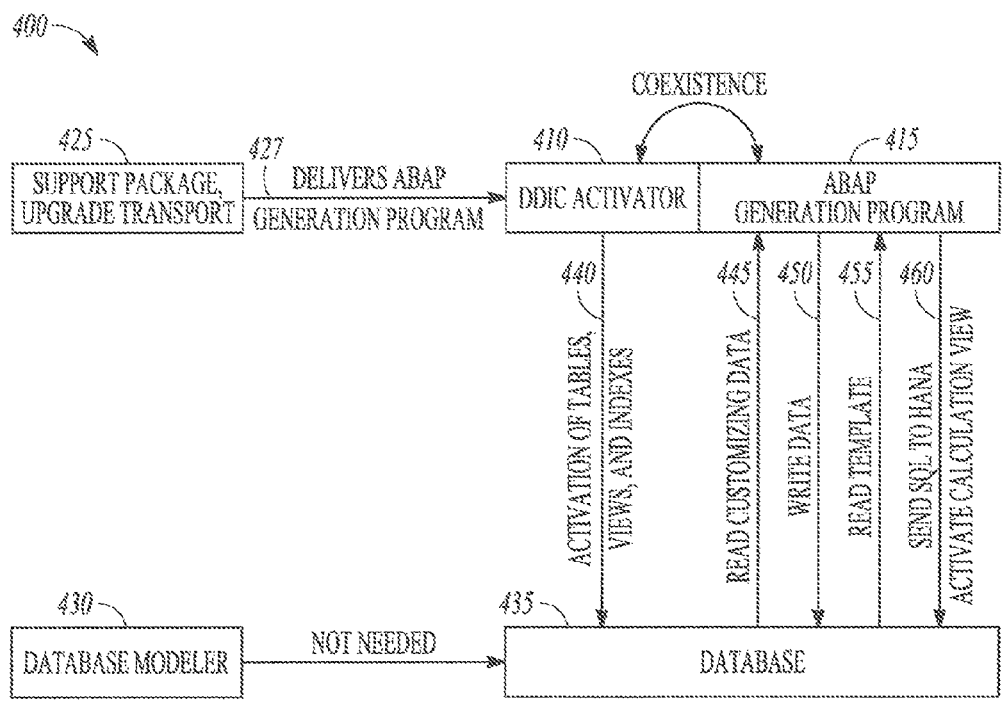
FIG. 4 is a block diagram illustrating use of a common transport for updates according to an example embodiment.

FIG. 4 is a block flow diagram of a system 400 illustrating the use of a common transport for all DDIC objects along with coexistence of a DDIC activator 410 and ABAP view generator 415 in an application services layer 420. A support package, upgrade, and transport component 425 is used to deliver changes to the application services layer via a transport path 427. The application services layer obtains customization information from the database to determine bow a customer has modified the database, and then modifies the update so that it can be applied to update the database taking into account the customer modifications. The term "customer modifications" is meant to cover all modifications made by or on behalf of the customer, such as by consultants and third party applications.

Database modeler content 430 is not utilized for updates or integration of application code into database 435 in one embodiment. This eliminates the need for a second transport path and avoids synchronization efforts between them. Instead the traditional ABAP transport path 427 is used to deliver ABAP generation programs to view generator 415. The ABAP generation programs are basically view-specific but share a common infrastructure. They can be seen as complementary to the DDIC activator program 410. DDIC activator program 410 performs its known functions including activation for tables, indexes and simple views whereas the ABAP generation programs performs the activation for the analytical views 230 and calculation views 240. The generation programs are on the same architectural tier as the DDIC activator.

The activation of tables, views, and indexes at 440 is triggered by upgrades, Support Packages or relevant customizing changes and works in several phases.

1.) Read 445 relevant customizing data from tables (e.g. in Financials: currencies, company codes, ledger definitions ... )

2.) Write 450 this data into existing tables so they can be easily JOINed into the calculation view 3.) Read 455 a generation template which contains a mixture of SQLScript fragments and variables that have to be replaced according to the data extracted in 1.)

4.) The result is a SQL statement that can be sent 460 to the HANA DB to finally create the calculation view 240 in the current environment.

After these steps the calculation view 240 can be consumed by Queries (SELECT ... FROM CalcView) from any ABAP program.

Notice that the generation program and the consuming ABAP program, can be delivered with the same transport or Support Package, there are no dependencies to be considered since the calculation views 240 and the ABAP consumers are delivered with the same vehicle.

Figure 5:
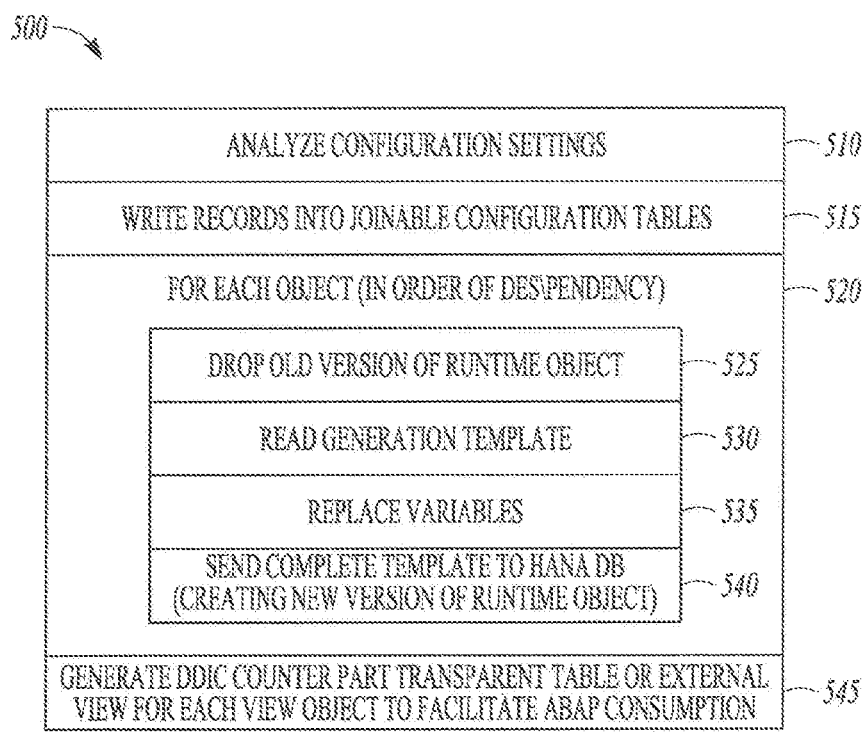
FIG. 5 is a flowchart illustrating logic of a view generation program according to an example embodiment.

FIG. 5 is a flowchart illustrating the logic of a typical view generation program 500. At 510, configuration settings are analyzed. At 515, records are written into JOINable configuration, tables. For each view object in order of dependency at 520, the following are performed. At 525, an old version of a runtime object is dropped. At 530, a generation template is read, and variables in the template are replaced at 535. At 540, the completed template is sent to the database, creating a new version of the runtime object. Once a completed template is created and sent to the database for each view object, a DDIC counterpart is generated as a transparent table or external view, for each view object to facilitate ABAP consumption.

Figure 6:
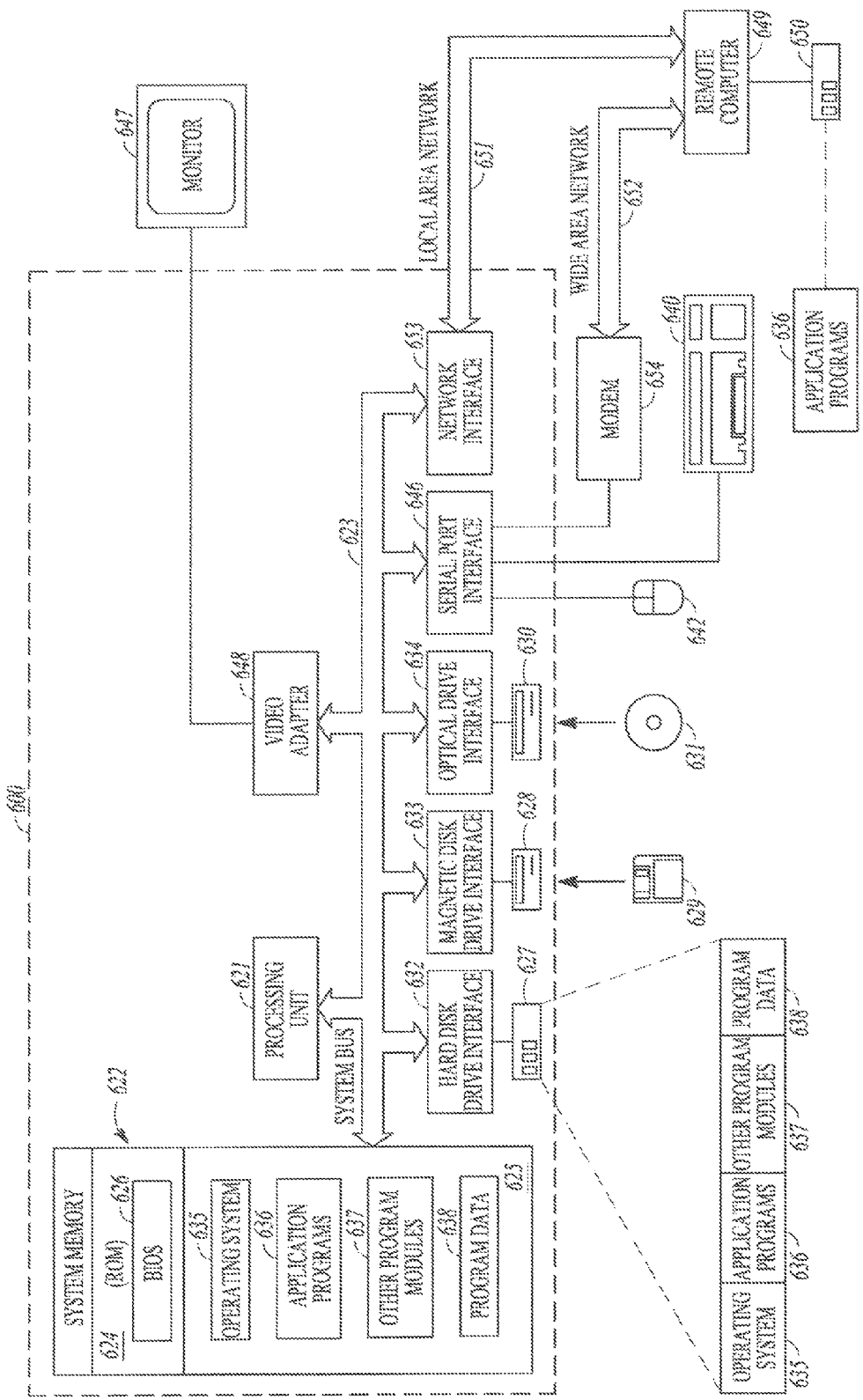
FIG. 6 is a block diagram illustrating a system for running programs to implement one or more methods or systems according to an example embodiment.

FIG. 6 is a block diagram of a computer system to implement methods according to an example embodiment. In the embodiment shown in FIG. 6, a hardware and operating environment is provided that is applicable to any of the elements shown in block form, including the database and application server.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application, programs 636, other program modules 637, and program data 638. Programming for implementing one or more processes or method described herein may be resident, on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, gameport, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are ail types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method comprising:
   receiving an in memory database application code update at a program that interfaces with the in memory database;
   obtaining customization data identifying changes made to the in memory database by a customer;
   generating a customized application code update to the in memory database as a function of changes identified; and
   applying the customized application code update to the in memory database to update a complex object running in the memory database without adversely affecting changes made to the in memory database by the customer.

2. The method of example 1 wherein obtaining customization data comprises reading customizing tables modified by the customer.

3. The method of any of examples 1-2 wherein the complex object is a calculation view object.

4. The method of example 3 wherein the calculation view object contains complex procedural logic.

5. The method of example 4 wherein the complex procedural logic includes at least one of loops and conditions.

6. The method of any of examples 3-6 and further comprising:
   reading a template corresponding to the calculation view object; and
   sending instructions to the database to activate the calculation view object based on the template.

7. The method of any of examples 3-7 wherein each calculation view has a view runtime object, and wherein the method further includes for each view object:
   dropping an old version of the runtime object;
   reading a generation template;
   replacing variables in the generation template as a function of the customization data; and
   sending a completed generation template to the database.

8. The method of example 7 and further including generating a data dictionary (DDIC) counterpart calculation view object.

9. The method of any of examples 1-8 wherein the customization data identifies fields added to the database by the customer.

10. The method of any of examples 1-9 wherein the customization data identities metadata for database objects describing tables, indexes, and views.

11. A computer readable storage device having instructions to cause specifically programmed machine to perform a method, the method comprising:
   receiving an in memory database application code update at a program that interfaces with the in memory database;
   obtaining customization data identifying changes made to the in memory database by a customer;
   generating a customized application code update to the in memory database as a function of changes identified; and
   applying the customized application code update to the in memory database to update a complex object running in the memory database without adversely affecting changes made to the in memory database by the customer.

12. The computer readable storage device of example 11 wherein obtaining customization data comprises reading customizing tables modified by the customer.

13. The computer readable storage device of any of examples 11-12 wherein the complex object is a calculation view object that contains complex procedural logic including at least one of loops and conditions.

14. The computer readable storage device of example 13 wherein the method further comprises:
reading a template corresponding to the calculation view object; and
sending instructions to the database to activate the calculation view object based on the template.

15. The computer readable storage device of any of examples 13-14 wherein each calculation view has a view runtime object, and wherein the method further includes for each view object:
dropping an old version of the runtime object;
reading a generation template;
replacing variables in the generation template as a function of the customization data; and
sending a completed generation template to the database.

16. A system comprising:
an application server running on a processor, the application server programmed to:
receive an in memory database application code update;
read customization information from the in memory database;
customize the in memory database application code update as a function of the read customization information; and
deploy the customized application code update as a complex object to run in the in memory database.

17. The system of example 16 wherein obtaining customization data comprises reading customizing tables modified by the customer.

18. The system of any of examples 16-17 wherein the complex object is a calculation view object that contains complex procedural logic, wherein the complex procedural logic includes at least one of loops and conditions.

19. The system of example 18 wherein the application server is further programmed to:
read a template corresponding to the calculation view object; and
send instructions to the database to activate the calculation view object based on the template.

20. The system of any of examples 18-19 wherein each calculation view has a view runtime object, and wherein the application server is further programmed for each view object to:
drop an old version of the runtime object;
read a generation template:
replace variables in the generation template as a function of the customization data; and
send a completed, generation template to the database.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving an in memory database application code update at a program that interfaces with the in memory database;
obtaining customization data identifying changes made to the in memory database by a customer;
generating a customized application code update to the in memory database as a function of changes identified and the received in memory database application code update; and
applying the customized application code update to the in memory database to update a complex object running in the memory database without adversely affecting changes made to the in memory database by the customer, wherein the complex object is a calculation view object, and wherein the method further includes for each calculation view object:
dropping an old version of a runtime object;
reading a generation template;
replacing variables in the generation template as a function of the customization data; and
sending a completed generation template to the database.

2. The method of claim 1 wherein obtaining customization data comprises reading customizing tables modified by the customer.

3. The method of claim 1 wherein the calculation view object contains complex procedural logic.

4. The method of claim 3 wherein the complex procedural logic includes at least one of loops and conditions.

5. The method of claim 1 and further comprising:
reading a template corresponding to the calculation view object; and
sending instructions to the database to activate the calculation view object based on the template.

6. The method of claim 5 and further including generating a data dictionary (DDIC) counterpart calculation view object.

7. The method of claim 1 wherein the customization data identifies fields added to the database by the customer.

8. The method of claim 1 wherein the customization data identifies metadata for database objects describing tables, indexes, and views.

9. A computer readable memory device having instructions to cause specifically programmed machine to perform a method, the method comprising:
receiving an in memory database application code update at a program that interfaces with the in memory database;
obtaining customization data identifying changes made to the in memory database by a customer;
generating a customized application code update to the in memory database as a function of changes identified and the received in memory database application code update; and
applying the customized application code update to the in memory database to update a complex object running in the memory database without adversely affecting changes made to the in memory database by the customer, wherein the complex object is a calculation view object, and wherein the method further includes for each calculation view object:
dropping an old version of a runtime object;
reading a generation template;
replacing variables in the generation template as a function of the customization data; and
sending a completed generation template to the database.

10. The computer readable storage device of claim 9 wherein obtaining customization data comprises reading customizing tables modified by the customer.

11. The computer readable storage device of claim 9 wherein the calculation view object contains complex procedural logic including at least one of loops and conditions.

12. The computer readable storage device of claim 11 wherein the method further comprises:
reading a template corresponding to the calculation view object; and
sending instructions to the database to activate the calculation view object based on the template.

13. A system comprising:
an application server running on a processor, the application server programmed to:
receive an in memory database application code update;
read customization information from the in memory database;
customize the in memory database application code update as a function of the read customization information and the received in memory database application code update; and
deploy the customized application code update as a complex object to run in the in memory database, wherein the complex object is a calculation view object, and wherein deploying further includes for each calculation view object:
dropping an old version of a runtime object;
reading a generation template;
replacing variables in the generation template as a function of the customization data; and
sending a completed generation template to the database.

14. The system of claim 13 wherein obtaining customization data comprises reading customizing tables modified by the customer.

15. The system of claim 13 wherein the calculation view object contains complex procedural logic, wherein the complex procedural logic includes at least one of loops and conditions.

16. The system of claim 15 wherein the application server is further programmed to:
read a template corresponding to the calculation view object; and
send instructions to the database to activate the calculation view object based on the template.

* * * * *